(12) United States Patent
Rabinovitz et al.

(10) Patent No.: US 7,000,037 B2
(45) Date of Patent: *Feb. 14, 2006

(54) LARGE ARRAY OF MASS DATA STORAGE DEVICES CONNECTED TO A COMPUTER BY A SERIAL LINK

(76) Inventors: Josef Rabinovitz, 20400 Plummer St., Chatsworth, CA (US) 91311; Eli Danino, 20400 Plummer St., Chatsworth, CA (US) 91311

( * ) Notice: Subject to any disclaimer, the term of this patent is extended or adjusted under 35 U.S.C. 154(b) by 0 days.

This patent is subject to a terminal disclaimer.

(21) Appl. No.: 10/316,980

(22) Filed: Dec. 9, 2002

(65) Prior Publication Data

US 2004/0083325 A1    Apr. 29, 2004

Related U.S. Application Data

(63) Continuation-in-part of application No. 10/281,899, filed on Oct. 24, 2002.

(51) Int. Cl.
*G06F 13/12* (2006.01)

(52) U.S. Cl. .............................. 710/71; 710/63; 710/64; 710/72

(58) Field of Classification Search ................. 710/36, 710/62, 74; 711/111–114
See application file for complete search history.

(56) References Cited

U.S. PATENT DOCUMENTS

| | | | | |
|---|---|---|---|---|
| 5,764,924 A | * | 6/1998 | Hong | 710/300 |
| 6,425,033 B1 | * | 7/2002 | Conway et al. | 710/305 |
| 2003/0074515 A1 | * | 4/2003 | Resnick | 710/313 |
| 2003/0135577 A1 | * | 7/2003 | Weber et al. | 709/214 |
| 2003/0221061 A1 | * | 11/2003 | El-Batal et al. | 711/114 |
| 2004/0010660 A1 | * | 1/2004 | Konshak et al. | 711/114 |
| 2004/0019709 A1 | * | 1/2004 | Bissessur et al. | 710/14 |
| 2004/0019711 A1 | * | 1/2004 | Bissessur et al. | 710/22 |

* cited by examiner

*Primary Examiner*—Kim Huynh
*Assistant Examiner*—Alan S. Chen
(74) *Attorney, Agent, or Firm*—W. Edward Johansen (57) ABSTRACT

A peripheral data storage subsystem is for use with a computer system. The computer system has a host PCI bus and a serial PCI host bus adapter coupled to the host PCI bus. The peripheral data storage subsystem includes a plurality of data storage devices and a data storage device to parallel PCI interface that is coupled to each of the data storage devices, a parallel PCI to serial PCI interface coupled to the data storage device to parallel PCI interface and a serial PCI link interconnect. The serial PCI link-interconnect couples the parallel PCI to serial PCI interface of the peripheral data storage subsystem to the serial PCI host bus adapter of the computer system.

8 Claims, 6 Drawing Sheets

LARGE ARRAY OF MASS DATA STORAGE DEVICES CONNECTED TO A COMPUTER BY A SERIAL LINK

This application is a continuation-in-part of an application filed Oct. 24, 2002 under Ser. No. 10/281,899.

BACKGROUND OF THE INVENTION

The present invention relates to an arrangement for using a serial-PCI connection between computing devices and remote mass data storage-devices in order to create highly accessible, flexible, high-performance, low-cost storage systems.

U.S. Pat. No. 6,421,760 teaches a high performance RAID system for a PC that includes a controller card that controls an array of ATA disk drives. The controller card includes an array of automated disk drive controllers, each of which controls one respective disk drive. The disk drive controllers are connected to a micro-controller by a control bus and are connected to an automated coprocessor by a packet-switched bus. The coprocessor accesses system memory and a local buffer. In operation, the disk drive controllers respond to controller commands from the micro-controller by accessing their respective disk drives, and by sending packets to the coprocessor over the packet-switched bus. The packets carry I/O data (in both directions, with the coprocessor filling-in packet payloads on I/O writes). The packets also carry transfer commands and target addresses that are used by the coprocessor to access the buffer and system memory. The packets also carry special completion values (generated by the micro-controller) and I/O request identifiers that are processed by a logic circuit of the coprocessor to detect the completion of processing of each I/O request. The coprocessor grants the packet-switched bus to the disk drive controllers using a round robin arbitration protocol that guarantees a minimum I/O bandwidth to each disk drive. This minimum I/O bandwidth is preferably greater than the sustained transfer rate of each disk drive, so that all drives of the array can operate at the sustained transfer rate without the formation of a bottleneck.

U.S. Pat. No. 6,388,590 teaches a transmission interface that is compatible with the AT Attachment Packet Interface (ATAPI) that achieves transfer rates greater than those possible with an Integrated Disc Electronics (IDE) bus. The transmission interface includes a transmission ATAPI circuit, a packetizing circuit and a converter. The transmission ATAPI circuit monitors the content of the ATAPI and, when a change is detected, generates a first set of signals representative of that change. The first set of signals is single-ended, parallel to one another and use Transistor-Transistor Logic (TTL) voltage levels. The packetizing circuit packetizes the first set of signals to generate a second set of signals, which representing a packet. The packet payload represents the change in the contents of the ATAPI. The second set of signals is also single-ended, parallel to one another and use TTL voltage levels. The converter converts the second set of signals into a third set of signals and couples these to a serial bus. The third set of signals is serial to one another, and use low voltage level, differential signaling. The third set of signals is suited for transmission by the serial bus, which includes many fewer wires than available in an IDE bus while operating at a faster data rate.

U.S. Pat. No. 6,363,211 teaches video data and audio data inputted respectively from a camera system and a microphone that are compressed and encoded in a video compressor/expander-encoder/decoder and an audio compressor/expander-encoder/decoder respectively, and then are multiplexed in a multiplexer. Subsequently the multiplexed data are supplied to a hard disk drive via an AV interface, a host bus, an interface adaptor and an interface. Information representing the kind of the data is written in a register. The data supplied to the hard disk drive are recorded in a disk, on the basis of such information, by a method conforming to the data. And in a reproduction mode, the data are reproduced, on the basis of such information, by a method conforming to the data. Thus, the data can be recorded or reproduced efficiently by the relevant method conforming to the kind of the data.

U.S. Pat. No. 6,188,571 teaches a method and apparatus for a mass storage subsystem such as a RAID array that includes a housing which defines first and second cavities with the first cavity housing an array controller such as a RAID controller. The second cavity houses a plurality of substantially conventional IDE drives conforming to the 3.5" form factor. The array is configured to maximize cooling of the array controller and the drives within the extremely small space defined by the housing.

U.S. Pat. No. 6,134,630 teaches a high-performance RAID system for a PC that includes a controller card that controls an array of ATA disk drives. The controller card includes an array of automated disk drive controllers, each of which controls one respective disk drive. The disk drive controllers are connected to a micro-controller by a control bus and are connected to an automated coprocessor by a packet-switched bus. The coprocessor accesses system memory and a local buffer. In operation, the disk drive controllers respond to controller commands from the micro-controller by accessing their respective disk drives, and by sending packets to the coprocessor over the packet-switched bus. The packets carry I/O data (in both directions, with the coprocessor filling-in packet payloads on I/O writes), and carry transfer-commands and target-addresses that are used by the coprocessor to access the buffer and system memory. The packets also carry special completion values (generated by the micro-controller) and I/O request identifiers that are processed by a logic circuit of the coprocessor to detect the completion of processing of each I/O request. The coprocessor grants the packet-switched bus to the disk drive controllers using a round robin arbitration protocol that guarantees a minimum I/O bandwidth to each disk drive. This minimum I/O bandwidth is preferably greater than the sustained transfer rate of each disk drive, so that all drives of the array can operate at the sustained transfer rate without the formation of a bottleneck.

U.S. Pat. No. 6,003,105 teaches a long-haul PCI bridge pier that includes a PCI interface for connection to a PCI bus and a high speed link interface for connection to a high speed link. A PCI adapter is operative to transform PCI information received at the PCI interface into high-speed information to be transmitted through the high speed interface and is operative to transform high speed information received at the high speed interface into PCI information to be transmitted through the PCI interface. The PCI bridge pier permits remote-connection of a PCI bus with a high-speed link such as a serial link. Two such PCI bridge piers, in combination with a high-speed link may be used for implementing a long haul PCI-to-PCI-bridge.

U.S. Pat. No. 5,967,796 teaches an interface cable that allows access to an operational Peripheral Component Interconnect (PCI) bus compatible circuit board is disclosed. A flat flexible cable secures a plurality of connectors at substantially equal intervals. The connectors on the flat cable are adapted to receive a connection on a first edge of the PCI compatible circuit board. When the PCI compatible circuit board is plugged into the flat flexible cable, a second edge of the PCI compatible circuit board which is opposite the first edge is free to move laterally, away from neighboring circuit boards in response to a flexing of the flat flexible cable. Open space is created adjacent to the PCI compatible circuit board allowing sufficient access to surfaces of the functioning PCI compatible circuit board for testing purpose.

U.S. Pat. No. 5,948,092 teaches a personal computer system that includes a first housing coupled to a second housing with a multi-conductor cable. The first housing includes an IDE direct access storage device having an opening for receiving a removable storage medium. The second housing is separate from the first housing and includes a microprocessor coupled to a local bus and an expansion bus, a first IDE controller, a non-volatile storage device coupled to the local bus and a power supply. The cable is coupled to the first and second housings for electrically connecting devices in the first housing to devices in the second housing. The second housing has a first interface coupled to the expansion bus, the first IDE controller and the cable. The first housing includes a second interface coupled to the cable and the IDE device. The first interface is operative to determine when a bus cycle initiated by a device in the second housing is directed to the IDE device in the first housing and to transfer data from the IDE controller to the IDE device via the cable and the second interface when a bus cycle is directed to the IDE device.

U.S. Pat. No. 5,905,885 teaches a peripheral interface system that includes a pair of integrated circuits, referred to as a system adapter and a socket controller, that use a communication protocol, referred to as a windowed-interchip-communication protocol, to interface peripherals, such as PCMCIA cards or infrared devices, and other subsystems having different formats with a CPU system bus. The system-adapter communicates to a hard disk drive subsystem using the ATA communication standards to interface an ATA hard disk drive with the CPU system bus. Communication between the system adapter and the socket controller, which communicates with PCMCIA peripheral cards and IR peripherals, is accomplished using the windowed-interchip-communication protocol that may share hardware resources with other communication protocols. Communication between the system adapter and the hard disk drive and between the system adapter and the socket controller may be provided on the same chain of a standard signal ribbon cable. Alternatively communication between an expansion board and a socket controller may be performed across a cable separate from the hard disk drives having a different signal line format. The system adapter may be included within a single interface expansion board which can be connected to the motherboard and CPU system bus or it can be directly connected or soldered to the motherboard and communicate with the socket controller and ATA hard disk drives using one or more busses.

U.S. Pat. No. 5,987,533 teaches a SCSI bus-based mass storage system for automatically setting the addresses of a plurality of disk devices that includes a SCSI controller for providing predetermined SCSI address signals including addresses data for each peripheral device, and a SCSI ID input device which receives and stores and forwards the corresponding SCSI address ID to the peripheral devices for setting the SCSI ID of addressable peripheral devices. The SCSI controller includes an N-bit shift register having a serial output for providing the SCSI address signals, and a counter for providing the clock signals. Further, the SCSI ID input device includes a plurality of M-bit shift registers which correspond to the number of addressable peripheral devices, where M corresponds to the number of SCSI ID setting jumpers provided in the peripheral devices. Since a manual jumper setting for the SCSI ID can be avoided, faster and more convenient use of the SCSI devices is possible when one or more SCSI devices are added to the computer system. Disk drives and controllers for personal computers have been developed that utilize the SCSI bus standard for control and transfer of data to be stored. SCSI bus-based mass storage systems typically use a large number of disk drives to achieve the required data capacities. As is well known, the SCSI serial interface takes roles of a connection path that transfers commands issued by the computer to many peripheral devices. The controller performs controlling of the peripheral device and is embedded in the same peripheral device. Therefore, the SCSI interface acts like a "network card" and provides features of error detection and restoration, detecting and controlling of data collision, and communication with the other devices. Also, there are benefits to distributing data across a large number of smaller capacity drives including faster average access time, higher data transfer rate, improved mass storage system reliability, and reduced data loss in the event of a drive failure. In an earlier SCSI bus-based mass storage system, a SCSI bus interconnects a SCSI controller with peripheral devices. The SCSI controller includes a host adaptor that is in communication with a computer, and the peripheral devices commonly include their own controllers. In this storage system, the peripheral devices are usually hard disk drives, and may include CD-ROM drives. According to the SCSI-I standard, only eight device addresses are possible in that there is one host controller and seven peripheral devices. If more than seven peripheral devices are required, multiple host controllers must be added to the mass storage system. Meanwhile, those peripheral devices (hereinafter "SCSI devices" or "devices") report their SCSI address ID to the computer system via the SCSI bus in the computer booting process. The SCSI devices commonly include jumper-setting blocks. Therefore, in the event of adding an SCSI device in the computer system, it is difficult for users to set the SCSI address ID by hand, and the jumper setting procedure required at every addition of the SCSI device is annoying and time-consuming. To overcome the limitation of the number of SCSI devices, the SCSI-II standard has been established which allows the device addressing to be increased to a limit of sixteen devices. Further, a method for sharing device addresses between different devices on the SCSI bus to thereby increase the number of devices that can utilize the bus has been disclosed in U.S. Pat. No. 5,367,647. The sharing is SCSI address ID number between the SCSI host adaptor and a SCSI device controller on the bus. While the number of addressable SCSI devices is remarkably increased, the manual jumper setting for the SCSI address ID and serviceability problems remain.

U.S. Pat. No. 5,822,184 teaches a modular data device assembly for a computer is disclosed that has a housing that is designed to fit into a conventional, industry standard size expansion bay. Individual plug-in data storage devices such as hard disk drives or CD-ROM drives are disposed vertically in a stacked formation within the housing. A motherboard with plug-in connectors to which the drives are connected allows easy replacement of defective data devices, which devices slide in or out. The disk drives and modular data device assemblies may be arrayed in series or in parallel to a controller. By its modular structure and redundant storage functions the modular data device assembly benefits from what is known as Redundant Array of Independent Disks principle.

U.S. Pat. No. 5,224,019 teaches a modular computer chassis that includes a main chassis to which a motherboard is attached and a sub-chassis attachable to the main chassis. The sub-chassis holds at least one computer component and is electrically connected to the motherboard. In this manner, the computer component is separable from the main chassis by removing the sub-chassis.

U.S. Pat. No. 5,309,323 teaches a removable electrical unit with combined grip and release mechanism. Each of the removable disk drives is mountable into a corresponding device bay in front of the subsystem chassis. Each removable disk drive incorporates a soft stop and release mechanism.

U.S. Pat. No. 5,224,020 teaches a modular electrical apparatus that includes a plurality of customer removable electrical devices such as disk drives. The devices and support units are all blind pluggable into a removable central electrical distribution unit.

U.S. Pat. Nos. 5,006,959 and 5,119,497 teach a computer apparatus with modular components that includes segregated functional units like a disk array, various plug-in card packages, power/fan unit, and a motherboard. Another goal for moving towards modular computer components is to improve reliability. One concept in the field of disk drives is known as Redundant Array of Independent Disks (RAID). A number of disk drives are interconnected in an array for redundant storage of data. Failure of one disk drive does not destroy irreplaceable data. An example of the RAID concept is disclosed in U.S. Pat. No. 4,754,397 teaches a housing array for containing a plurality of hardware element modules such as disk drives, a plurality of modularized power supplies, and plural power distribution modules, each being connected to a separate source of primary facility power. Each module is self-aligning and blind-installable within the housing and may be installed and removed without tools, without disturbing the electrical cabling within the cabinet, and automatically by a maintenance robot. Despite the advances in designing modular components and associated hardware for computers, there is still a need for a modular component that easily adapts to conventional size restraints, yet benefits from RAID concepts.

U.S. Pat. No. 6,188,571 teaches an apparatus for a mass storage subsystem, such as a RAID array, that includes a housing which defines first and second cavities with the first cavity housing an array controller such as a RAID controller. The second cavity houses a plurality of substantially conventional IDE drives conforming to the 3.5" form factor. The array is configured to maximize cooling of the array controller and the drives within the extremely small space defined by the housing.

U.S. Pat. No. 6,363,211 teaches video data and audio data that are inputted respectively from a camera system and a microphone and are compressed and encoded in a video compressor/expander-encoder/decoder and an audio compressor/expander-encoder/decoder respectively, and then are multiplexed in a multiplexer. Subsequently the multiplexed data are supplied to a hard disk drive via an AV interface, a host bus, an interface adaptor and an interface. Information representing the kind of the data is written in a register. The data supplied to the hard disk drive are recorded in a disk, on the basis of such information, by a method conforming to the data. And in a reproduction mode, the data are reproduced, on the basis of such information, by a method conforming to the data.

Modern computers utilize data buses to move data from one area of the computer to another. A modern computer has multiple data buses that interconnect different components of the computer system. Computer buses typically are implemented by a series of copper lines within a printed circuit board generally referred to as "traces." A computer data bus is essentially a shared highway that interconnects different components of a computer system, including a microprocessor, disk-drive controller, memory, and input/output ports. Buses are characterized by the number of bits of data that they are able to transfer at a single time (e.g., an 8-bit data bus simultaneously transfers 8 bits of data in parallel; a 16-bit data bus simultaneously transfers 16 bits in parallel). The bus is integral to internal data transfer. Modern personal computers have specialized data buses to maximize operational efficiency. High performance data buses within modern personal computers are specialized for interconnecting transaction intensive sub-systems. Generally, buses coupled directly to the main processor transfer data at a higher rate than peripheral buses. High-speed buses require special design considerations to ensure system integrity. Industry standards for bus architectures have been created by organizations within the computer industry. One such architecture that is gaining popularity is an architecture containing a "PCI bus." The PCI bus specification was derived from provisions introduced by Intel Corporation. The Intel provisions detail a local bus system for a personal computer. A PCI compliant circuit-cards can operate in a computer built to PCI standards. Computer industry committees continually review PCI-specification. An operational PCI local bus requires a PCI controller card to regulate bus utilization. Typically, the PCI controller card is installed in one of the PCI card receiving sockets. The PCI controller can exchange data with the computer's central processor, simultaneously transferring either 32 bits or 64 bits of data, depending on the implementation. A PCI controller additionally allows intelligent PCI-compliant adaptors to perform tasks concurrently with the CPU utilizing a technique called "bus mastering." The PCI specification also allows for multiplexing. Microsoft Press Computer Dictionary 295 (2ed. 1994). Another bus standard is an industry standard bus. A PCI bus is a higher level or faster bus than the Industry Standard (ISA) bus. An ISA bus is typically utilized to interconnect a keyboard to the computer system whereas a PCI bus typically interconnects devices requiring faster communication, such as disk drives and communication interfaces. Due to the high data rate on a PCI bus, the physical interconnection of PCI-compliant circuit boards is critical. Transmission line properties such as interference susceptibility, impedance and length are critical to ensure bus communication integrity.

Computers built to PCI specifications can be upgraded or enhanced by adding PCI-compliant circuit cards. A PCI-compliant circuit board is often referred to as a "PCI card" by those skilled in the art. Printed circuit boards that are sold to consumers generally have been subjected to extensive development and testing prior to their sale. The development phase of a printed circuit board can be very expensive. Design and production defects that avoid detection due to inadequate test capabilities can substantially add to the cost of a product. Production delays due to insufficient testing resources further add to the cost of a product. A conventional personal computer contains a "motherboard" which provides internal buses to interconnect a main processor with other sub-systems of the computer. The motherboard is the main circuit board containing the primary components of the computer system. A PCI circuit board undergoing a thorough development procedure must be electrically connected to an operational computer system. Due to the compactness of motherboards and rigid PCI bus specifications, PCI connectors are typically located close together on a motherboard. Visual access, as well as physical access to electrical signals during operation of PCI compatible circuit boards may be extremely limited. Access to desired locations on a PCI circuit card during a test that utilizes a motherboard requires that the PCI card be remotely located from the motherboard. Testing typically requires an extension cable or an adaptor cable. For example, extension cables can be plugged into the motherboard and the PCI card, then the PCI card can be placed in a location which provides full access. Alternately, special devices such as extender circuit boards can be plugged into a PCI card-receiving socket to extend a duplicative connector at a location above surrounding PCI cards. An extender card places the board under test above surrounding obstructions and allows access to signals on the PCI card. Often, initial PCI card design concepts are hand-wired by technicians. Typically, hand wired prototype circuit boards are physically much larger than allowed by the PCI specification. Hence, many conceptual designs will not fit in a conventional motherboard environment due to space constraints. A commonly utilized development tool is a PCI extender card having right angle connectors. Extender cards with right angles provide access to signals on the topside of the PCI compatible circuit board, however, access to signals on the underside of the PCI card is again limited. Further, only one right angle extender card per system can be attached to the motherboard. Generally, each party to the development of a PCI card has different requirements. A large quantity of application specific extender cards or test fixtures is built during the development of a product. Often, an application specific test fixture is useless after completion of the development of a specific PCI card. Extender cards and test fixtures add to the cost of product development. Additionally, the added transmission line lengths introduced by adaptor cables and/or extender cards can create phenomena which is not present when the PCI card is plugged directly into a motherboard. More particularly, card extenders or adaptors may degrade the signal quality on the PCI bus. Cables having excessive lengths induce data transfer problems, particularly timing skew and interference. Currently, in the development of PCI compatible circuit boards, the circuit boards must operate in an electrical environment that is different from the electrical environment found in actual field operation. Often, not all of the design problems and difficulties can be determined utilizing extender cards and/or adaptor cables. Additionally, problems manifest in the development of PCI circuit cards that are a result of the test environment. It therefore should be obvious that there is a need for a system and method for allowing access to the surface of a PCI compatible circuit board during operational testing. Further, a need exists for a reusable test fixture that accommodates oversized PCI compatible circuit boards. Additionally, it has become apparent that adequate testing of a PCI compatible card requires a test environment that accurately simulates field- operating conditions.

U.S. Pat. No. 5,822,184 teaches a modular data device assembly for a computer is disclosed that has a housing that is designed to fit into a conventional, industry standard size expansion bay. Individual plug-in data storage devices such as hard disk drives or CD-ROM drives are disposed vertically in a stacked formation within the housing. A motherboard with plug-in connectors to which the drives are connected allows easy replacement of defective data devices, which devices slide in or out. The disk drives and modular data device assemblies may be arrayed in series or in parallel to a controller. By its modular structure and redundant storage functions, the present invention benefits from what is known as Redundant Array of Independent Disks principle.

U.S. Pat. No. 6,446,148 teaches a protocol for expanding control elements of an ATA-based disk channel that supports device command and data information issued over the channel to a number of peripheral devices coupled to the channel. In addition, channel command circuitry issues channel commands which control channel related functional blocks, each of which performs non-device specific channel related functions. The channel commands are interpreted by the channel and are not directed to peripheral devices coupled thereto. Channel commands include identification indicia that distinguish a channel command from a device command.

U.S. Patent Application 20020087898 teaches an apparatus that facilitates direct access to a Serial-Advanced Technology Attachment (Serial-ATA) device by an autonomous subsystem in the absence of the main operating system.

DESCRIPTION OF THE PRIOR ART AND RELATED INFORMATION

U.S. Pat. No. 5,822,184 teaches a modular data device assembly for a computer that has a housing that is designed to fit into a conventional, industry standard size expansion bay. Individual plug-in data storage devices such as hard disk drives or CD-ROM drives are disposed vertically in a stacked formation within the housing. A motherboard with plug-in connectors to which the drives are connected allows easy replacement of defective data devices, which devices slide in or out. The disk drives and modular data device assemblies may be arrayed in series or in parallel to a controller. By its modular structure and redundant storage functions, the present invention benefits from what is known as Redundant Array of Independent Disks principle.

Figure 1:
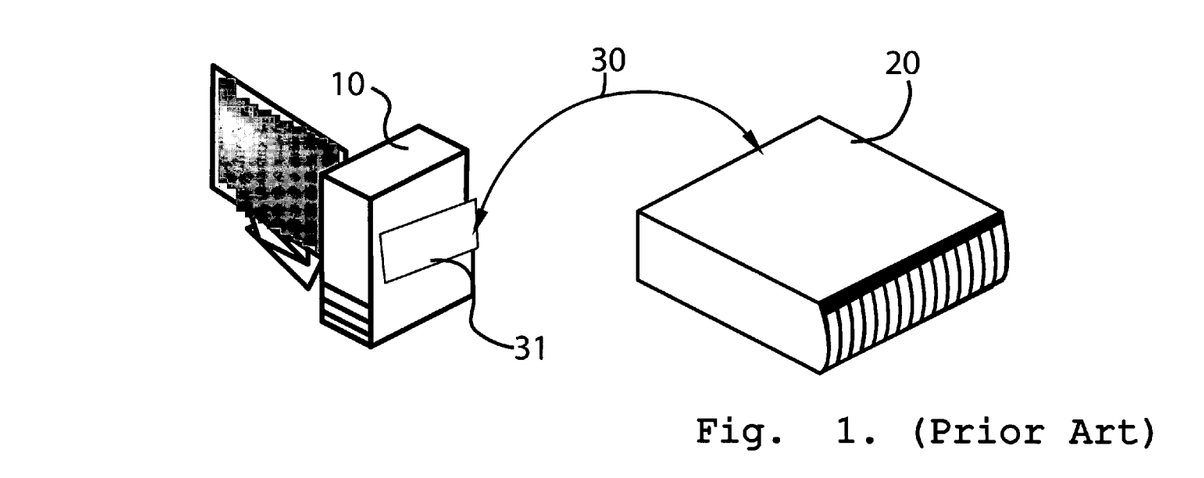
FIG. 1 is a schematic drawing of a first computer that is connected to a remote storage device using a SCSI bus according to the prior art.

Magnetic disks, rigid disk, magnetic optical disc (CD and DVD et cetera.), solid state memory cards and drives that are used as data storage devices and expansion arrays of those data storage devices have progressed almost exponentially over time, and continue to do so. The attachment of additional disk drives above and beyond those contained in the host computer or server has used primarily the SCSI (Small Computer System Interface) or FC-AL (Fibre Channel Arbitrated Loop) bus, and compatible disk controllers and disk drive devices to achieve array expansion. FIG. 1 shows a typical configuration of a computer, a host bus adapter, an interconnect and a disk storage subsystem.

Other common approaches include using Universal Serial Bus (USB), Serial Attached SCSI (S-Attached SCSI), Firewire (IEEE 1394) and bus attaching to ATA (AT Attachment, also commonly called ATAPI for AT Attachment Packet Interface) disk drive devices using device-mounted adapters, and creating Redundant Array of Independent Disks (RAID) arrays using ATA devices and array-located controllers which adapt ATA drives to common storage bus expansion architecture, including SCSI and FC-AL.

The limitations and disadvantages of traditional approaches listed above include the size of the arrays that can be assembled; the data transfer speeds that can be achieved; interconnect cable length limits; and the high cost of interface connectors, adapters, converters and cables due to their specialized nature.

The inventors hereby incorporate the above referenced patents into this specification.

SUMMARY OF THE INVENTION

The invention is a peripheral data storage subsystem for use with a computer system that has a host PCI bus and a serial PCI host bus adapter coupled to the host PCI bus.

In a first aspect of the invention the peripheral data storage subsystem includes a plurality of data storage devices and a data storage device to parallel PCI interface that is coupled to each of the data storage devices, a parallel PCI to serial PCI interface coupled to the data storage device to parallel PCI interface and a serial PCI link interconnect. The serial PCI link interconnect couples the parallel PCI to serial PCI interface of the peripheral data storage subsystem to the serial PCI host bus adapter of the computer system.

In a second aspect of the invention the data storage devices are Serial ATA hard disk drives and the data storage device to parallel PCI interface is a Serial ATA to parallel PCI interface.

In a third aspect of the invention the peripheral data storage subsystem includes an enclosure having a backplane with slots for the plurality of serial ATA storage devices.

Other aspects and many of the attendant advantages will be more readily appreciated as the same becomes better understood by reference to the following detailed description and considered in connection with the accompanying drawing in which like reference symbols designate like parts throughout the figures.

The features of the present invention which are believed to be novel are set forth with particularity in the appended claims.

DESCRIPTION OF THE PREFERRED EMBODIMENT

Referring to FIG. 1 a first prior art computer 10 is connected to a remote data storage device 20 by a SCSI bus 30. The computer 10 includes a host bus adapter 31.

Figure 2:
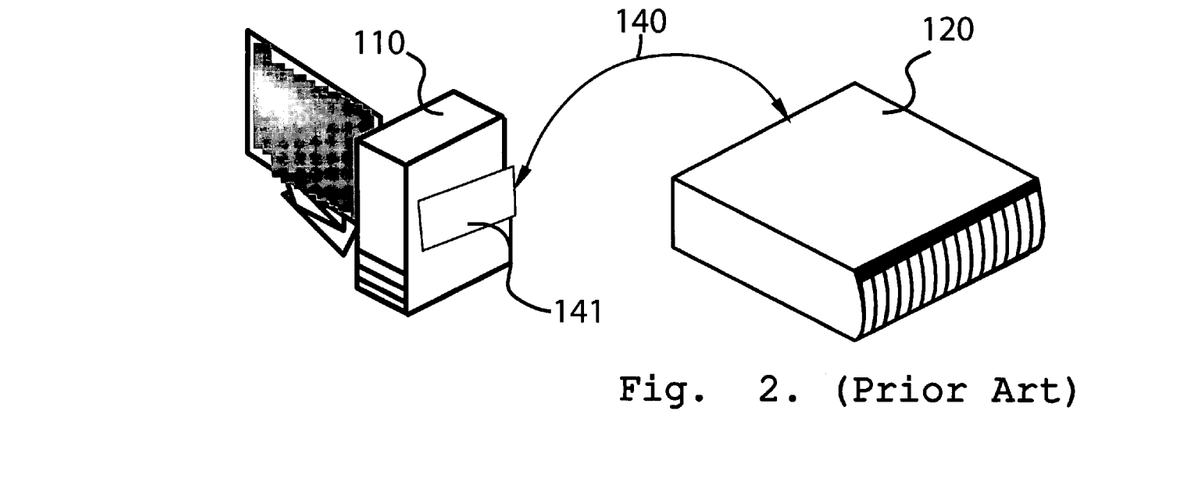
FIG. 2 is a schematic drawing of a second computer that is connected to a remote storage device using a fibre channel bus according to the prior art.

Referring to FIG. 2 a second prior art computer 110 is connected to a remote data storage device 120 by a fibre channel bus 140. The computer 110 includes a host adapter 141.

Figure 3:
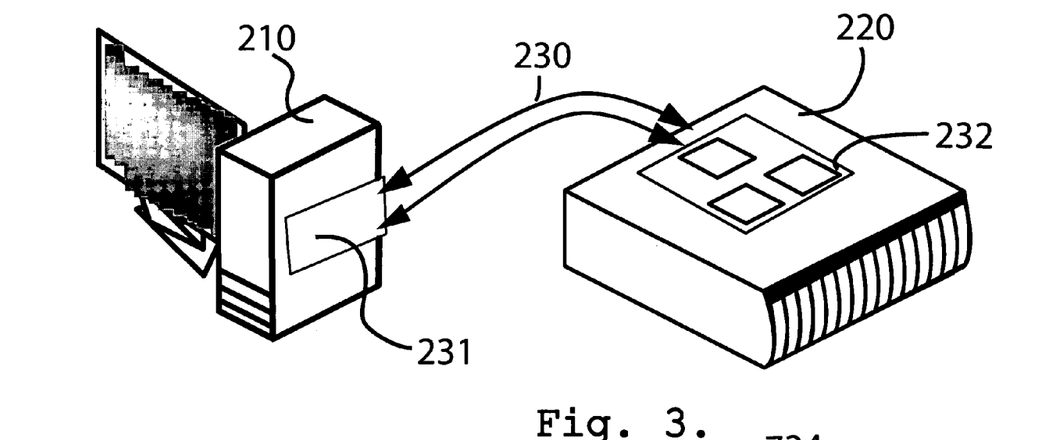
FIG. 3 is a schematic drawing of a computer that is connected to a remote data storage device using a Serial-PCI bus according to the present invention.

Referring to FIG. 3 a computer 210 is connected to a remote data storage device 220 using a Serial-PCI bus 230 to form a data storage system. The computer 210 includes a Serial PCI host adapter 231. The remote data storage device 220 includes a Serial PCI Module 232. Two thin wires denote that the Serial-PCI bus connection typically uses two links, but pictorially these two thin wires, each of which is typically a twisted-pair, are often replaced with a single thin wire containing two twisted-pairs.

The data storage system provides an innovative method for connecting remote, extension storage devices to a host computing device, using a Serial-PCI extension interface and link connections. The data storage system may be configured and connected to provide faster data throughput for large mass storage arrays than has been previously available conventional technologies. The inventors have already developed products that utilize Serial ATA disk storage devices connected to remote host computing devices via a matrix of PCI-to-Serial PCI host adapters, Serial PCI wired links, Serial PCI-to-PCI bridges and PCI-to-Serial ATA controllers which in effect extend the host computer's PCI bus to collocate with the high-speed Serial ATA disk data storage devices, or any other data storage device, themselves. The data storage system provides the fastest possible throughput consistent with fault tolerance and high availability as are demanded by applications and the current market trend. The data storage system also provides a fast bus interface for Serial PCI transmission from a host computer to a plurality storage subsystems and links from that Serial PCI interface to an Serial PCI bridge device which is capable of remotely locating the original PCI bus connection for any number of expansion devices. The data storage system bridges that recreated PCI bus to a Serial ATA interface, for direct attachment to disk storage devices. The data storage system further provides a higher-throughput data expansion capability thereby enabling more data storage devices and clusters of data storage devices than any previous arrangement or technology thus providing users the benefit of extremely fast and high-capacity data storage at the lowest possible cost.

Figure 4:
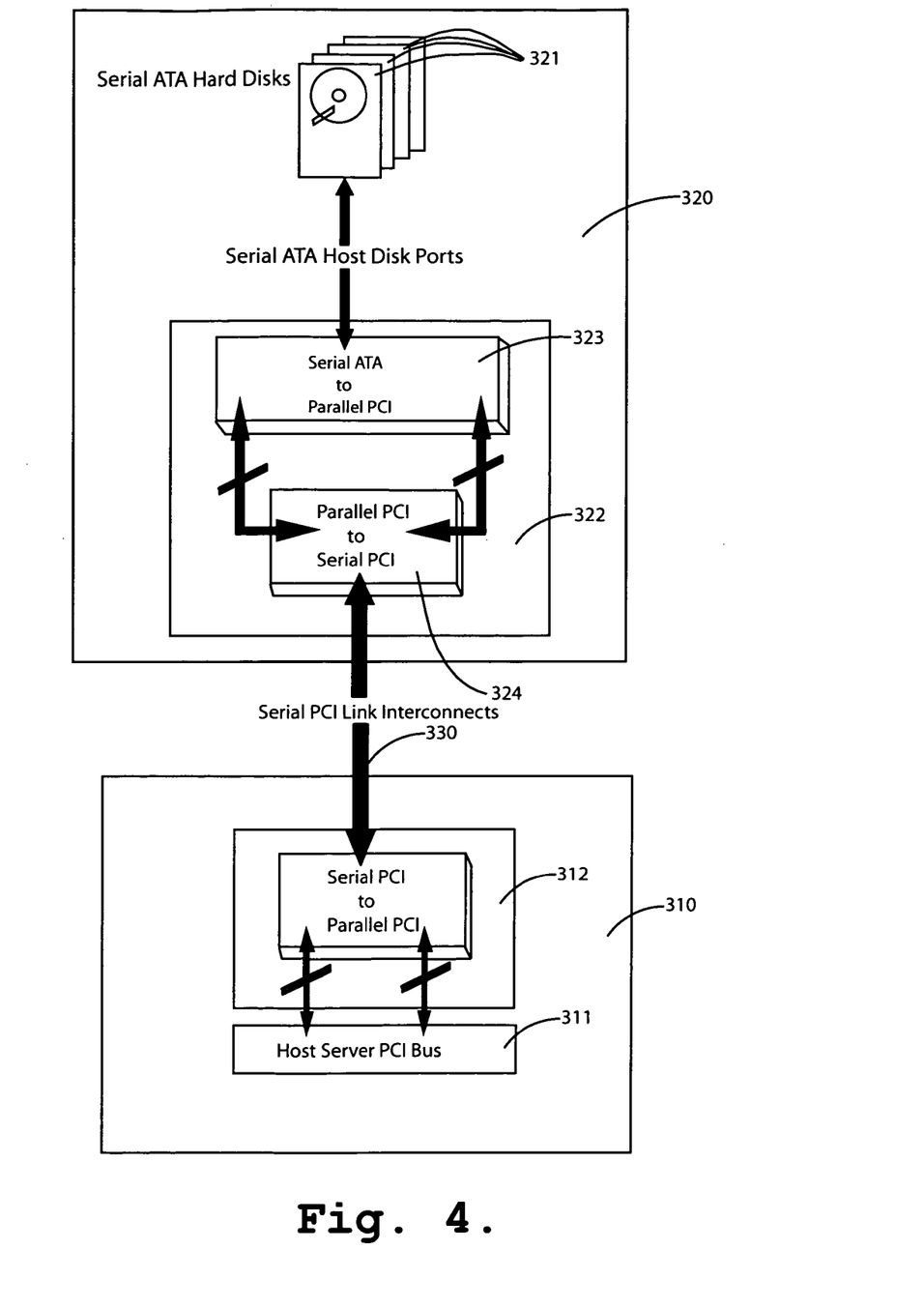
FIG. 4 is a block diagram of a host computer having standard PCI bus that converts to Serial PCI, connects through a serial cable to the remote data storage device that contains a Serial PCI to PCI bridge and a PCI to Serial ATA controller that connects to Serial ATA disk drives in accordance with the first embodiment of the present invention.

Referring to FIG. 4 in conjunction with FIG. 3 a host computer 310 has a standard PCI bus 311 and a (parallel) PCI to Serial PCI converter 312. A disk data storage subsystem 320 has four Serial ATA Hard Drive 321 and a module 322 that has a Serial ATA to Parallel PCI Interface 323 and a parallel PCI to serial PCI Interface 324. A Serial PCI Link Interconnect 330 is a serial cable and connects the remote storage device 320 to the host server PCI bus 311 of the computer 310.

Figure 5:
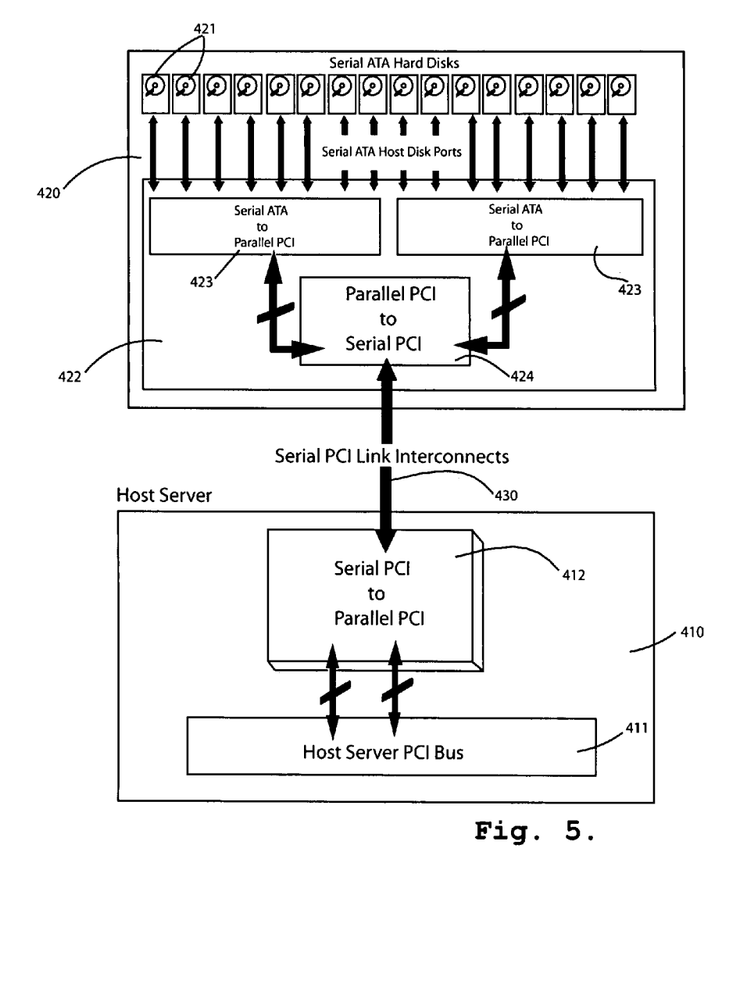
FIG. 5 is a block diagram of a host computer having standard PCI bus that converts to Serial PCI, connects through a serial cable to the remote data storage device that contains a Serial PCI to PCI bridge and a PCI to Serial ATA controller that connects to Serial ATA disk with a "two-chip" solution capable of driving a larger plurality of Serial ATA disk drives in accordance with the second embodiment of the present invention.

Referring to FIG. 5 in conjunction with FIG. 3 a host computer 410 has a standard PCI bus 411 and a (parallel) PCI to Serial PCI converter 412. A disk data storage subsystem 420 has fifteen Serial ATA Hard Drive 421 and a module 422 that has two Serial ATA to Parallel PCI Interfaces 423 and a parallel PCI to serial PCI Interface 424. A Serial PCI Link Interconnect 430 is a serial cable and connects the remote storage device 420 to the host server PCI bus 411 of the computer 410. A "two-chip" solution is capable of driving a larger plurality of Serial ATA disk drives.

Figure 6:
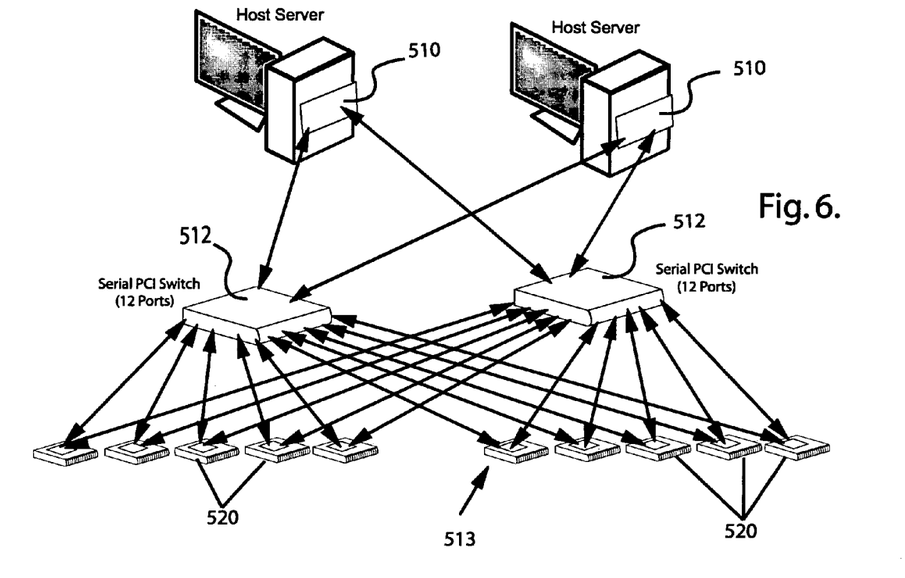
FIG. 6 is a block diagram of a cluster configuration for high-performance fault-tolerance device array

Referring to FIG. 6 a cluster of high-performance fault-tolerance device arrays includes two host servers 510, two ten-port switches 512 and ten storage arrays 513 containing fifteen storage devices 520 each are configured as a 150-drive array. Each switch 512 can have more or less ports. More switches 512 can be added and more host servers 510 can be connected. Each storage array 513 might contain any number of data storage devices.

Figure 7:
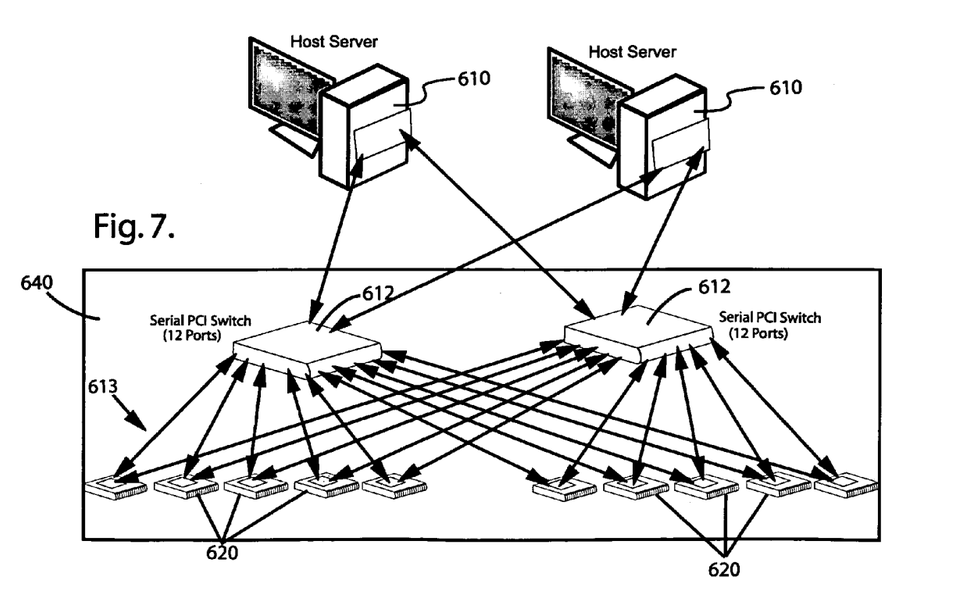
FIG. 7 is a block diagram of a cluster configuration for high-performance fault-tolerance wherein the Serial PCI Switches can be collocated within the data storage devices

Referring to FIG. 7 a cluster of high-performance fault-tolerance device arrays includes two host servers 610, two ten-port switches 612 and ten storage arrays 613 containing fifteen storage devices 620 each are configured as a 150-drive array. The Serial PCI Switches 612 are collocated within the data storage array 613. Each switch 612 can have more or less ports. More switches 612 can be added and more host servers 610 can be connected. Each storage array 613 might contain any number of data storage devices. All the systems diagrammed thus far are JBOD disk arrays. However, in all cases, they could be RAID arrays to provide fault-tolerance or special performance enhancements. RAID would be implemented in the Serial PCI bus, using an embedded systems approach (firmware), and includes all RAID options, e.g., RAID 0, 1, 5, 10, 50. Each disk array product, such as a 15-bay storage subsystem enclosure, would be its own RAID.

The PCI bus is being extended to each disk array chassis, enclosure or shelf so that the conversion of S-PCI (or other bus as noted previously) to PCI occurs within the chassis, enclosure or shelf. A standard PCI slot, or two, or more, could be included in that array enclosure thereby providing for PCI connected peripherals remotely from the host computer, co-located with the disk array itself. This essentially allows general user interface computer functionality at "both ends" of the system; a monitor, sound card, network adapter or other peripheral could be attached directly to the disk enclosure via the appropriate PCI card.

Figure 8:
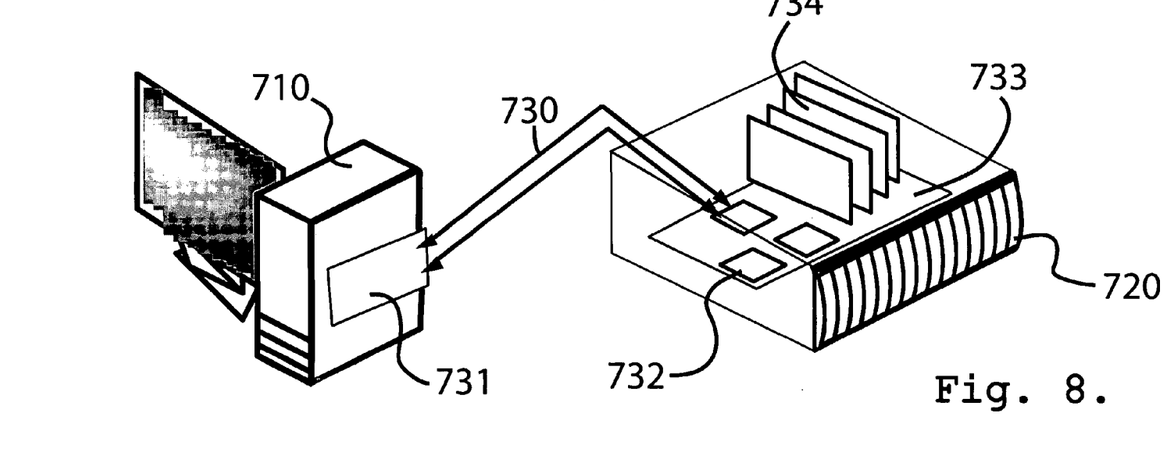
FIG. 8 is a schematic drawing showing a computer that is connected to a remote storage device using a Serial-PCI bus according to the present invention.

Referring to FIG. 8 a computer 710 is connected to a remote data storage device 720 using a Serial-PCI bus 730 to form a data storage system. The computer 710 includes a Serial PCI host adapter 731. The remote data storage device 720 includes a Serial PCI Module 732, a PCI bus expansion module 733 and a plurality of PCI cards 734. The PCI Bus Expansion Module 732 is collocated within the data storage device 720 so that additional PCI expansion cards may be installed to provide computer functionality in the data storage subsystem. Such cards may include NIC for ethernet connectivity, a VGA card for connection of a video monitor, sound card for connection to speakers, and/or data modem card for connection to a telephone line.

Figure 9:
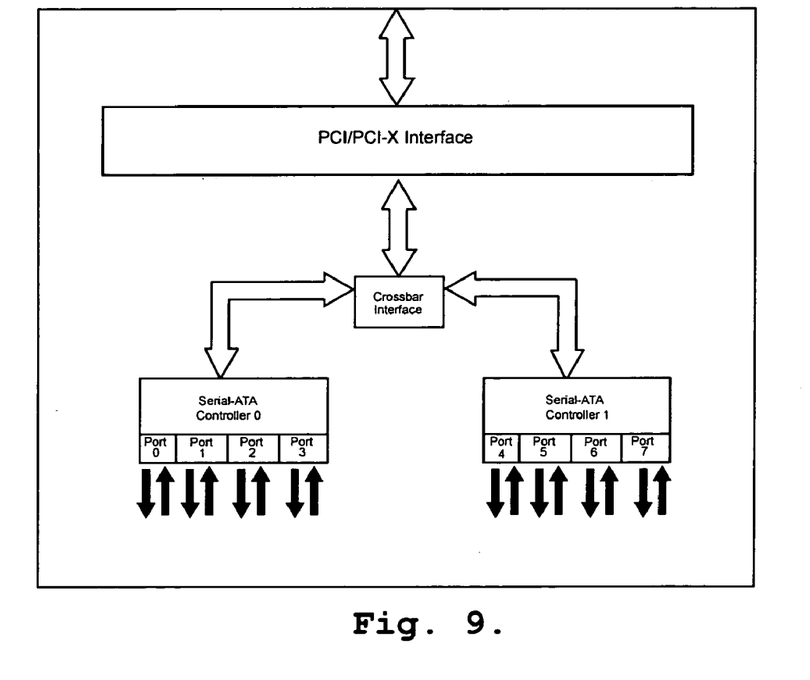
FIG. 9 is a block diagram of aa PCI to Serial-ATA host controller which is used in the present invention.

Referring to FIG. 9 Marvell Technology Group manufactures PCI to MV88SX5080 Serial-ATA host controller. The controller supports as many as eight Serial-ATA drives.

Marvell Technology Group, Ltd. manufactures a bridge-chip between serial and parallel ATA interfaces to implement a high-performance disk drive. Other manufacturers of the bridge chip are Vitesse and Silicon Image.

StarGen Inc. manufactures the StarGen SG2010 bridge-chip and the SG1010 StarFabric Switch. The StarGen SG2010 bridge-chip is a PCI peripheral chip that bridges the serial interface of StarFabric to legacy PCI devices for communication and embedded systems. Other manufacturers of the bridge chip are Intel and PLX.

This specification details a new approach to mass storage device array expansion that uses Serial-ATA devices and PCI bus to accomplish such expansion in a low-cost, high-performance and greatly scalable manner. The PCI bus is used in these examples. But PCIx or other extendable interconnect buses, such as VERSA Module Euro-card, 64-bit-VME, VME extensions for Instrumentation, Compact PCI and Futurebus+ may be used and are assumed to be covered by this application. New-generation Application-Specific Integrated Circuit devices bridge the Serial-ATA bus to 64-bit PCI bus. Arrays of storage devices can be assembled such that 256 PCI targets, each of which may contain a plurality of disks, to form very large scale storage systems providing higher speed data transfers at lower cost than previously possible. Using current production disk densities and available devices, such an array (example: 256 targets, 16 drives per target) can have a capacity of 720 Petabytes or 754,974,720 Gigabytes. This is record-breaking capacity versus throughput already, but an added benefit to this approach is cost. Serial-ATA devices will cost approximately 30% what SCSI and FC-AL devices of similar capacity cost on the open market. Although not scalable on their own, Serial-ATA devices bridged to PCI bus architecture are enormously scalable as discussed in the preceding paragraphs. A small-scale disk storage subsystem includes a computer, a PCI host adapter with serial PCI links, link-interconnects, serial PCI link to PCI bridge chips and PCI to Serial-ATA bridge chips which fan out to a plurality of Serial-ATA drives. In order to achieve the inexpensive and fast throughput interconnections of host computers to disk arrays, ASIC devices form the bridge from S-PCI to parallel PCI. Serial PCI is a new bus that uses serialized PCI architecture and overcomes the parallel PCI bus expansion obstacles. These devices allow the use of inexpensive copper wire twisted pair cabling, similar to Category 5 networking cable and connectors to provide full-bandwidth PCI performance over inexpensive serial wiring. This in itself is new technology likely covered in other applications. This application is not for Serial-PCI bridge ASIC devices, but for the implementation thereof. Other bridge devices and a PCI to Serial-PCI host bus adapter form large scale disk storage arrays that provide very fast input-output transfers over reasonably long lengths of inexpensive cables, using Serial-ATA storage devices. The estimated data transfer speed of 528 MB/s (Megabytes per second), which is faster than current SCSI or FC-AL (or ATA) technology is achievable with this approach.

Referring again to FIG. 5 in conjunction with FIG. 6 and FIG. 7 an entire large scale storage subsystem using a computer with a standard front-side PCI bus, a PCI host adapter with Serial PCI link and I/O ports, CAT5 interconnecting cables. A disk storage array subsystem enclosure contains Serial PCI link I/Os to PCI bridge ASIC and two PCI to Serial ATA ASIC devices and provides connectivity to eight S-ATA disk devices each thereby providing up to as many as sixteen S-ATA disk drives. The array is in either a JBOD (Just a Bunch Of Disks) or RAID configuration for disk storage expansion of the host computer. This configuration can serve any quantity of external disk storage devices from one to infinity and the product to be sold might contain any such number of devices. The configuration is only an example of the type of storage subsystem that may be assembled using the approach discussed herein.

Referring again to FIG. 5 in conjunction with FIG. 6 a minimum configuration has potential single points of failure, such as the host itself. To demonstrate how scalable the data storage system is a fault-tolerant, large scale, expandable disk array system includes whose elements might include two identical servers, each containing a parallel PCI-to- Serial-PCI host bus adapter with dual link input/output ports, two Serial PCI switches each having twelve link input/output ports, ten 15-disk Serial-ATA enclosures, each having S-PCI link input/output ports for host connectivity and internal ASIC bridges from Serial-PCI to parallel PCI, and parallel PCI to Serial ATA. This data storage system configuration provides exceptional fault-tolerance, typical of a "cluster" configuration as described in Microsoft Windows NT, with no single point of failure, and redundancy in all system elements. Some of that redundancy is provided by the inventors' design employing redundant (N+1) power, cooling and interconnectivity. Additional fault-tolerance, provided by redundancy, comes from the dual host and dual switch cluster configuration. This application is intended to cover Serial ATA to extendable-bus interconnection, serially connected to a PCI host bus adapter and may involve Serial-PCI or any number of extendable bus adapters, any quantity of targets and any quantity of storage devices. The block diagrams depict typical configurations that may be assembled using commonly available storage blocks and the disk array enclosures. The Serial PCI Switches shown in FIG. 6 may be built directly into their disk array enclosures, in most cases. The switches are shown as separate diagramatic blocks for clarification only. Building the Serial-PCI Switches into the disk array enclosure is a cost-saving and space-saving measure and reduces the cost and space consumed by a separate switch enclosure and the extra input/output link cables that would be required if separate switch enclosures were used. Technically, if all switches were twelve port devices as indicated, only every fourth data storage device would require an internal S-PCI switch, because one switch can serve two server input/output links and four disk storage input/output links (six links equal twelve ports). By installing a switch in only every fourth data storage device, there is a substantial cost-savings for the user, with no sacrifice in data integrity or fault-tolerance. The system depicted in FIG. 6 assumes ten data storage devices containing fifteen 180 GB capacity Serial ATA disk drives each, would have a total mass storage capacity of 27 TB while occupying only 30 rack units of vertical equipment cabinet space for the storage elements, including switches. This is unheard-of capacity for an inexpensive disk array.

From the foregoing it can be seen that a large array of mass data storage devices connected to a computer by a serial link has been described. In the description, specific materials and configurations have been set forth in order to provide a more complete understanding of the present invention.

Accordingly it is intended that the foregoing disclosure be considered only as an illustration of the principle of the present invention.

What is claimed is:

1. A peripheral data storage subsystem for use with a computer which includes a host parallel bus, a parallel to serial host bus adapter that contains a first integrated circuit whereby the first integrated circuit contains a parallel to serial device bridge that has a parallel input/output and a serial input/output and whereby the parallel input/output of the parallel to serial device bridge is electrically coupled to the host parallel bus, said peripheral data storage subsystem comprising:
   a. an enclosure;
   b. a back-plane disposed in said enclosure and mechanically coupled to said enclosure;
   c. a plurality of serial data storage devices disposed within said enclosure and electrically coupled to said back-plane whereby each of said serial data storage device has a serial input and a serial output;
   d. a second integrated circuit containing a plurality of serial controllers, each of which has a serial input and a serial output, and a serial to parallel device bridge that has a plurality of serial input/outputs and a plurality of parallel input/outputs and also containing a parallel controller converting said parallel input/outputs to an interface whereby a serial input and a serial output of each of said serial controllers is electrically coupled to a serial output and a serial input, respectively, of one of said serial data storage devices;
   e. a third integrated circuit containing a parallel to serial device bridge that has a parallel input/output and a serial input/output whereby said parallel input/output of said parallel to serial device bridge is electrically coupled to said interface of said parallel controller of said second integrated circuit; and
   f. a serial link electrically coupling said serial input/output of said parallel to serial device bridge of said third integrated circuit to the input/output of the parallel to serial device bridge of the first integrated circuit so that said peripheral data storage subsystem is electrically coupled to the computer.

2. A peripheral data storage subsystem for use with a computer according to claim 1 wherein said host parallel bus is a PCI bus and said interface is a PCI interface.

3. A peripheral data storage subsystem for use with a computer according to claim 2 wherein said serial data storage devices are Serial ATA hard disk drives.

4. A data storage network including a computer according to claim 3, a primary serial link which is a serial link according to claim 3 and is electrically coupled at one end to the serial input/output of the parallel to serial device bridge of the first integrated circuit, a serial switch having a primary serial input/output which is electrically coupled to said primary serial link at the other end and a plurality of secondary serial input/outputs, a plurality of peripheral data storage subsystems each according to claim 3 and a plurality of secondary serial links each of which electrically couples a serial input/output of a parallel to serial device bridge of a third integrated circuit of one of said peripheral data storage subsystems.

5. A data storage network including a first plurality of computers each according to claim 3, a first plurality of primary serial links each of which is a serial link according to claim 3 and is electrically coupled at one end to a serial input/output of a parallel to serial device bridge of a first integrated circuit of one of the computers, a serial switch with a first plurality of primary serial input/outputs each of which is electrically coupled to one of said primary serial links at the other end and a second plurality of secondary serial input/outputs, a second plurality of peripheral data storage subsystems each according to claim 3 and a second plurality of secondary serial links each of which electrically couples a serial input/output of a parallel to serial device bridge of a third integrated circuit of one of said peripheral data storage subsystems to one of said serial input/outputs of said serial switch.

6. A data storage network comprising:
   a. a first plurality of computers each of which has a host parallel bus; and
   b. a first plurality of parallel to serial host bus adapters each of which includes a first integrated circuit containing a parallel to serial device bridge that has a parallel input/output and a serial input/output wherein said parallel input/output of said parallel to serial device bridge is electrically coupled to a host parallel bus of one of said computers;

c. a first plurality of primary serial links each of which is electrically coupled at one end to said serial input/output of said parallel to serial device bridge of said first integrated circuit;

d. a serial switch with a first plurality of primary serial input/outputs each of which is electrically coupled to one of said primary serial link at the other end and a second plurality of serial input/outputs;

e. a second plurality of peripheral data storage subsystems each of which includes:
  i. an enclosure;
  ii. a back-plane disposed in said enclosure and mechanically coupled to said enclosure;
  iii. a plurality of serial data storage devices disposed within said enclosure and electrically coupled to said back-plane whereby each of said serial data storage device has a serial input/output;
  iv. a second integrated circuit containing a plurality of serial controllers, each of which has a serial input and a serial output, and a serial to parallel device bridge that has a plurality of serial input/outputs and a plurality of parallel input/outputs and also containing a parallel controller converting said parallel input/outputs to an interface whereby a serial input and a serial output of each of said controllers is electrically coupled to a serial output and a serial input, respectively, of one of said serial data storage devices;
  v. a third integrated circuit containing a parallel to serial device bridge that has a parallel input/output and a serial input/output whereby said parallel input/output of said parallel to serial device bridge is electrically coupled to said interface of said parallel controller of said second integrated circuit; and f. a second plurality of second serial links each of which electrically couples a serial input/output of a parallel to serial device bridge of one of said third integrated circuit to one of said secondary input/outputs of said serial switch.

7. A data storage network according to claim 6 wherein said host parallel bus is a PCI bus and said interface is a PCI interface.

8. A data storage network according to claim 7 wherein each of said serial data storage devices is a Serial ATA hard disk drive.

* * * * *